C. E. WILLEY.
MEANS FOR HOLDING IN PLACE LAMINATIONS OF ALTERNATING CURRENT DYNAMOS AND MOTORS.
APPLICATION FILED DEC. 12, 1908.

938,033.

Patented Oct. 26, 1909.

WITNESSES:
Paul H. Frank
Frank E. Hoffman

INVENTOR
Charles E. Willey
BY
Marble & Matty
ATTORNEYS

UNITED STATES PATENT OFFICE.

CHARLES E. WILLEY, OF LOUISVILLE, KENTUCKY.

MEANS FOR HOLDING IN PLACE LAMINATIONS OF ALTERNATING-CURRENT DYNAMOS AND MOTORS.

938,033.  Specification of Letters Patent.  Patented Oct. 26, 1909.

Application filed December 12, 1908. Serial No. 467,229.

*To all whom it may concern:*

Be it known that I, CHARLES E. WILLEY, a citizen of the United States of America, and a resident of Louisville, county of Jefferson, State of Kentucky, have invented certain new and useful Means for Holding in Place Laminations of Alternating-Current Dynamos and Motors, of which the following is a specification.

My invention relates generally to the construction of alternating current dynamos and motors and particularly to means for holding in place the laminations of alternating current dynamos and motors, and comprises a novel split spring ring adapted to be seated in the frame of the machine to hold such laminations in place.

The objects of my invention are to improve and simplify means employed for holding in place laminations of alternating current machines, and to make such means easy to operate.

I will now proceed to describe my invention with reference to the accompanying drawings, in which—

Figure 1:
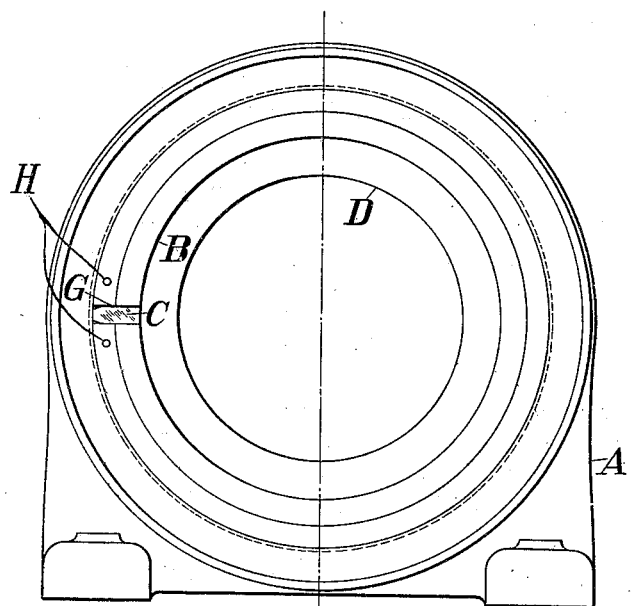
Figure 2:
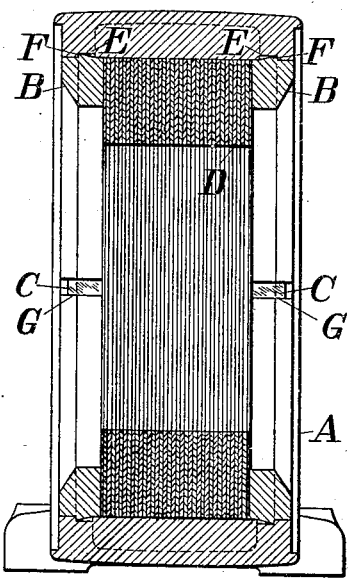
Figure 3:
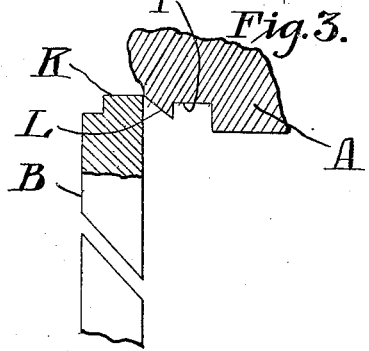
Figure 4:
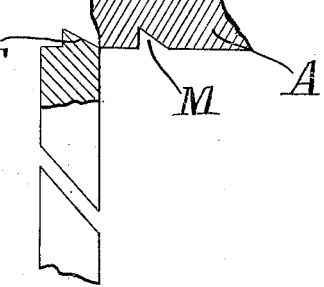

Figure 1 shows a side elevation of the frame of an alternating current motor or dynamo, with the laminations and holding ring in place therein. Fig. 2 shows a transverse section of the parts shown in Fig. 1. Fig. 3 shows a detail section and partial elevation of an alternative form of ring and frame; and Fig. 4 is a view similar to Fig. 3 showing a further alternative form of ring and frame.

Referring at first to Figs. 1 and 2, A designates the frame of the machine and B the spring clamping ring hereinbefore referred to. C designates a wedge used for expanding this ring. D designates the laminations held within frame A. E, E designate grooves in frame A receiving shoulders F formed on rings B, the construction being such that when these shoulders F are within the grooves E said rings are held against lateral escape. It will be noted that the peripheral faces of the shoulders F are beveled or conical so that, when one of the rings is to be inserted, merely pressing it against the annular frame tends to contract the ring so as to admit it into the frame. G designates the slot or space between the ends of each ring B into which the wedge C is driven.

The operation and manner of use of the clamping rings B will be readily understood. In erecting the machine, the laminations D are put in place and then the rings B are inserted and pressed home. Mere pressure against these rings causes the ring to contract until the shoulder F has completely entered the groove E, when the ring expands again so that the shoulder engages said groove and holds the ring in place. Once the ring is in place the wedge C is inserted and driven home, said wedge preventing any possible accidental disengagement of the ring from the frame.

To remove laminations, one or both of the rings B is or are removed. To remove a ring the corresponding wedge C is driven out and the ends of the ring are drawn together somewhat so as to reduce the diameter of the ring until it will clear the shoulder E. The ring may then be removed readily. To facilitate the drawing together of the ends of the ring B, as described, suitable holes H are provided in these ends, into which soles suitable tools may be inserted to draw the ends together.

As an alternative to having the shoulder F of the split ring beveled and arranged to engage a square shoulder in the frame, the inner edge of the frame may be beveled and the split ring have a straight shoulder. This is illustrated in Fig. 3 in which the frame is shown as having a square cornered groove I, and the ring as provided with a square cornered shoulder K, the orifice of the frame into which the ring is to be inserted having around it a beveled face L which the edge of the shoulder K engages when the ring is pressed in place. This beveled shoulder will obviously act to draw the ring together.

The groove in the frame need not necessarily be of rectangular section of course. In Fig. 4 I have shown the groove as of section corresponding to the section of an inclined-faced shoulder F on the ring, as shown in Fig. 2; this groove, in this Fig. 4, being designated by reference letter M.

What I claim is:—

1. In a machine of the class described, the combination of two members, viz., a frame adapted to hold laminations and a split ring adapted to fit within said frame when such laminations are in place, one of said members having a groove and the other of said members having a corresponding shoulder adapted to fit within such groove, one of said members having also an inclined face which will act to contract the ring when the latter is pressed home.

2. In a machine of the class described, the combination of two members, viz., a frame adapted to hold laminations and a split ring adapted to fit within said frame when such laminations are in place, one of said members having a groove and the other of said members having a corresponding shoulder adapted to fit within such groove, one of said members having also an inclined face which will act to contract the ring when the latter is pressed home, and means positively holding the ends of said split ring apart.

3. In a machine of the class described, the combination of a frame adapted to hold laminations and a split ring adapted to fit within said frame when said laminations are in place, said ring having a shoulder, that side of which shoulder which is nearest the frame when the ring is being inserted, being beveled, whereby pressure of the ring against the frame tends to contract said ring.

In testimony whereof I have signed this specification in the presence of two subscribing witnesses.

CHARLES E. WILLEY.

Witnesses:
M. GOULD,
M. PERRY.